United States Patent [19]

Huntsinger et al.

[11] Patent Number: 4,596,469
[45] Date of Patent: Jun. 24, 1986

[54] METHOD AND APPARATUS FOR MECHANICAL RIDDLING OF BOTTLED WINE

[75] Inventors: James E. Huntsinger, Windsor; Dale F. Steinke; James L. Jordan, both of Guerneville, all of Calif.

[73] Assignee: F. Korbel & Bros., Inc., Guerneville, Calif.

[21] Appl. No.: 482,147

[22] Filed: Apr. 5, 1983

Related U.S. Application Data

[63] Continuation-in-part of Ser. No. 266,833, May 26, 1981, Pat. No. 4,405,997, which is a continuation-in-part of Ser. No. 151,129, May 19, 1980, Pat. No. 4,356,208, which is a continuation of Ser. No. 890,305, Mar. 27, 1978, Pat. No. 4,235,940.

[51] Int. Cl.⁴ ............................................. B01F 11/00
[52] U.S. Cl. .................................. 366/111; 99/277.2; 366/128; 366/208; 366/219
[58] Field of Search .................. 99/277.1, 277.2, 275, 99/276, 277, 278; 426/592; 366/110, 111, 114, 108, 208, 219, 239

[56] References Cited

U.S. PATENT DOCUMENTS

| 496,759 | 5/1893 | Timby | 99/277.2 |
| 2,056,014 | 9/1936 | Moore | 366/209 |
| 2,514,078 | 7/1950 | Lee | 366/128 |
| 3,533,602 | 10/1970 | Heck | 99/277.2 |

FOREIGN PATENT DOCUMENTS 3996  2/1905  France ............................. 99/277.2

Primary Examiner—Robert W. Jenkins
Attorney, Agent, or Firm—Schapp and Hatch

[57] ABSTRACT

A method and apparatus for mechanically accomplishing riddling of bottled wines contained in shipping cartons by inverting pallet loads of the cartons so the bottles stand on their capped ends, jostling the bottles as by rapid tilting at predetermined intervals and in predetermined directions, and vibrating the cases and the bottles they contain at desired frequency and amplitude and for periods of predetermined duration. The apparatus provides a bed for receiving pallets loaded with stacked cases of bottled wine to be riddled, the bed being supported at its corners on pivot balls liftable from their supporting sockets which, in turn, have resilient supports. Selective tilting of the bed and its cargo is accomplished by inflatable air bags controlled by a timing system.

52 Claims, 16 Drawing Figures

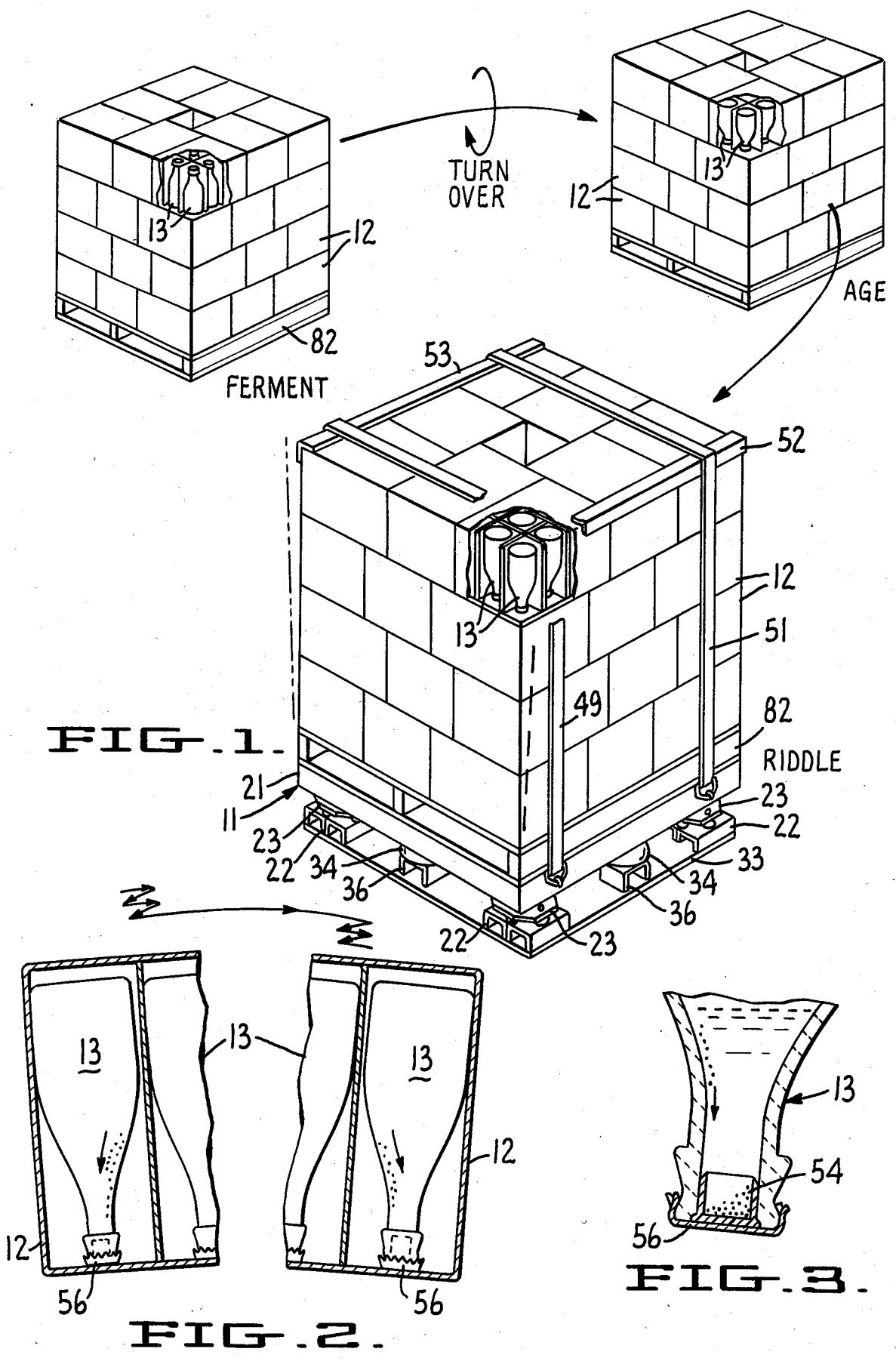

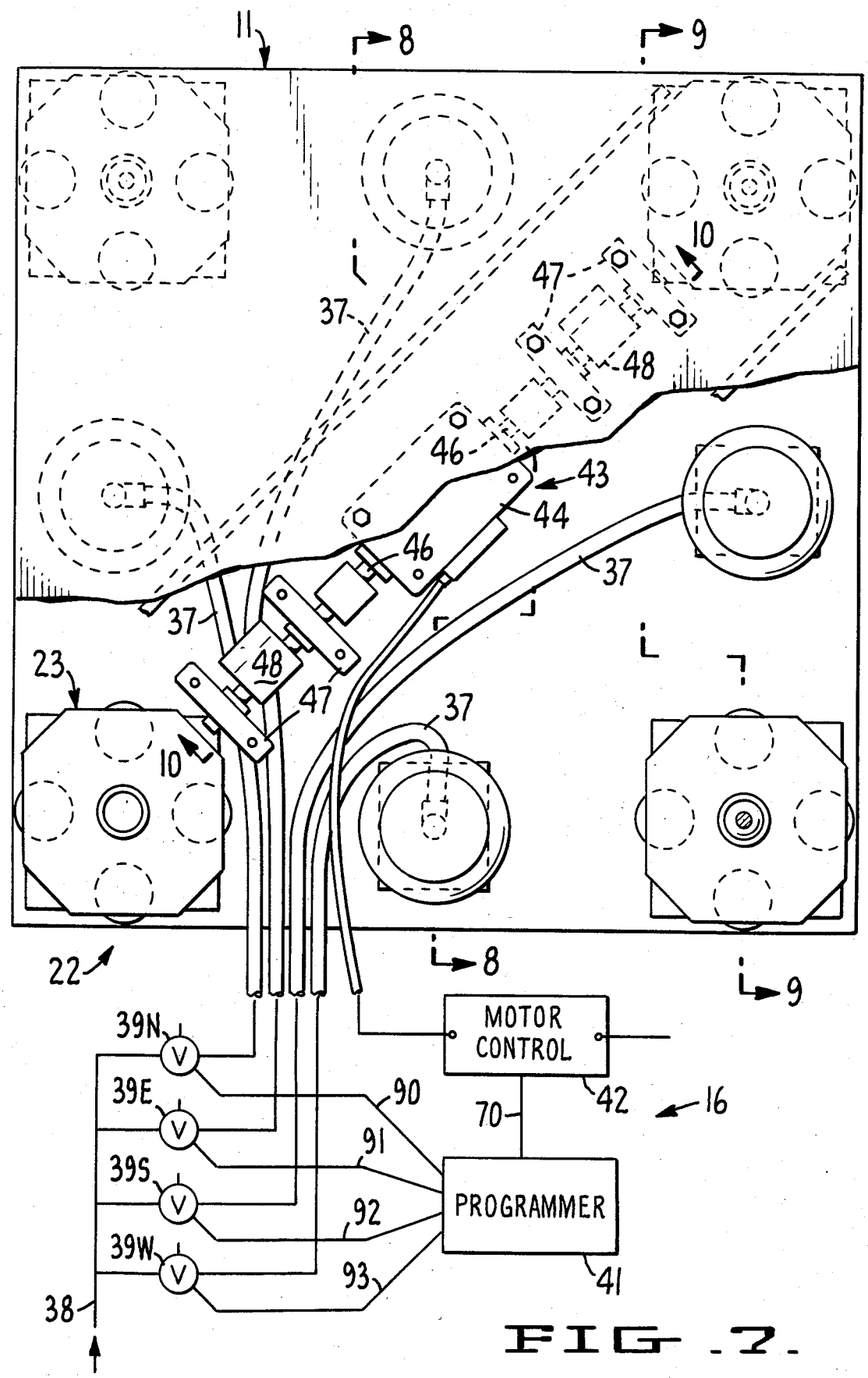

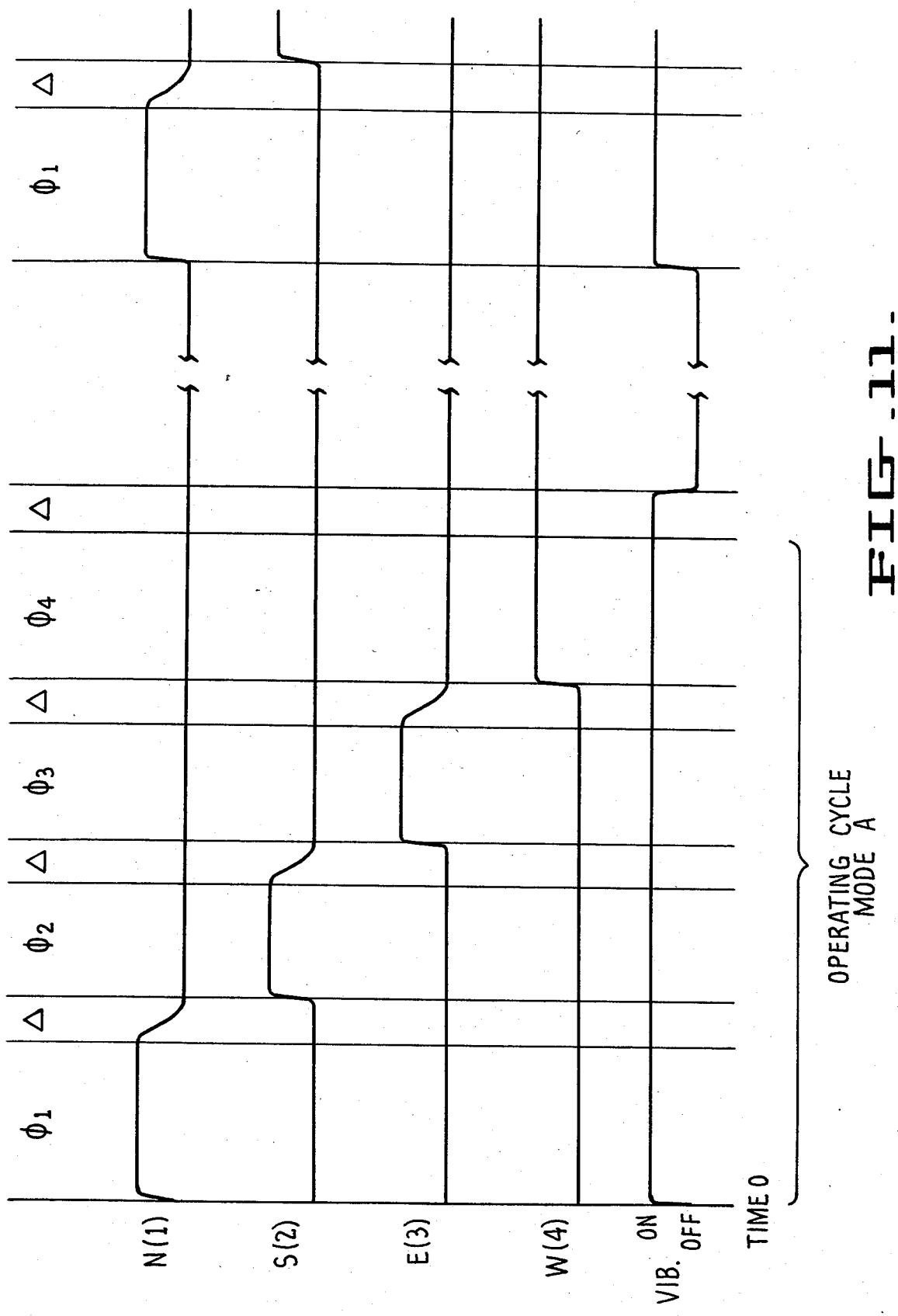
FIG._11.

METHOD AND APPARATUS FOR MECHANICAL RIDDLING OF BOTTLED WINE

BACKGROUND OF THE INVENTION

Cross-References to Other Applications

This application is a continuation-in-part of application Ser. No. 266,833, filed May 26, 1981, now U.S. Pat. No. 4,405,997; which is a continuation-in-part of Ser. No. 151,129 filed May 19, 1980, issued on Oct. 26, 1982 as U.S. Pat. No. 4,356,208; which is a continuation of Ser. No. 890,305 filed Mar. 27, 1978 and issued on Nov. 25, 1980 as Pat. No. 4,235,940.

Field of the Invention

This invention relates to improvements in the art of riddling wines such as champagne, and more particularly to riddling of bottled wines.

In the making of fine wines, and particularly in the making of bottle-fermented champagne, it is necessary to remove all suspended solids and sediment in order for the wine to have a sparkling, clear appearance. The sediment is the natural result of the fermentation process and includes yeast and other solid matter, often in the form of extremely fine particles which impart a cloudy appearance if left in the wine. The process of removing such sediment from the bottled wine has come to be known as "riddling".

The traditional method of accomplishing riddling involves manually grasping each bottle, pulling it part way out of the supporting rack, rotating the bottle approximately ninety degrees, and thereafter slamming the bottle back into the rack with sufficient force to cause the desired action. The purpose of riddling is to deposit all of the yeast and other solids at the outlet of the bottle from whence they may be removed at a later time. Removal of the accumulated sediment from the bottle is conventionally accomplished by freezing the neck of the bottle, removing the temporary crown cap, ejecting the frozen slug of wine containing the sediment and solids, and then corking the bottle.

Attempts have heretofore been made to utilize mechanical apparatus for accomplishing riddling of bottled wines. For example, U.S. Pat. No. 2,056,014 discloses a rack formed for spinning rows of bottles and tilting them from one side to the other. U.S. Pat. No. 3,533,602 discloses racks which eliminate the spinning of the bottles, these racks being adapted to tilt the bottles from side to side and to vibrate the rack and bottles thereon to accomplish riddling. These rack methods of riddling are considerably less labor intensive than the original hand method. However, the bottles still must be placed in temporary cartons for fermentation, then removed from the temporary cartons one by one and placed in position on the racks, then removed one by one from the racks when the riddling function has been accomplished and returned to the temporary cartons for transporting to the neck freezing and disgorging apparatus.

BRIEF SUMMARY OF THE INVENTION

U.S Pat. No. 4,235,940, of which the present application is a continuation-in-part, discloses a method and apparatus which eliminates a great part of the hand labor necessary with riddling racks for removing the bottles from the temporary cartons and placing them in the racks, and for removing the bottles from the racks after riddling and replacing them in the temporary cartons. This desirable result is accomplished by fermenting the bottled wines in compartmented packing cases, tilting the cases from side to side to jostle the bottles, and vibrating the entire cases of bottles, with the jostling and vibrating serving to free the solids from adherence to the inner surfaces of the neck of the bottle as they settle to the outlet.

This concept makes possible even greater savings of labor by loading the cases onto pallets, where they remain during the entire fermentation, aging and riddling processes. In said Pat. No. 4,235,940 entire pallet loads of cases of bottled wine are vibrated and are tilted from side to side to accomplish the desired jostling of the bottles in the cases. Of course, the desired jostling action may be accomplished in any suitable manner which provides an abrupt limited lateral movement of the bottle sufficient to afford the described dislodging of sediment from the inner surfaces of the bottle.

Different types of wines, and even different batches of the same type of wine, have different characteristics with regard to particle size, specific gravity, coherence and adherence. The vibrating action and the jostling action must be such as to dislodge the settling particles from the downwardly constricting surface of the neck of the bottle in such manner that the solids will settle onto the crown cap or other member at the outlet of the bottle, for convenient disposing of the sediment as by freezing in a slug of ice. At the same time, to accomplish the riddling action in the least possible time, it is desirable that neither the jostling action nor the vibrating action agitate the bottles sufficiently to stir the settled particles back into the main body of the wine. Accordingly, the number, frequency and magnitude of the jostlings and the intensity of the duration of the vibrating action are made adjustable for obtaining best results with the particular wine being riddled.

Applicants have found that a further improved riddling action may be accomplished by selectively effecting abrupt limited lateral movements of the bottled wine in a plurality of angularly related directions rather than just back and forth. Where jostling is effected by rapid tilting of the bottle, the dislodged particles tend to sink away from the upper portion of the inclined bottle to land eventually on the diametrically lower portions of the bottle. In the previous rack riddlers exemplified in U.S. Pat. No. 3,533,602, and in the pallet riddlers exemplified in related U.S. Pat. Nos. 4,235,940 and 4,356,208 and pending application Ser. No. 266,833, the bottles move back and forth in a single plane so that the solids sink onto first one side of the bottle and, upon tilting, to the other side of the bottle, with the solids tending to describe a somewhat zigzag path. The method and apparatus of the present invention provides a different and improved action by not confining the movement of the bottle to a back and forth tilting in a single plane, but rather, the bottle moves in a plurality of angularly related planes so that the sinking particles do not follow a mere zigzag back and forth path, but rather tend to follow a somewhat spiral path.

In the previously described hand method of riddling, the bottles are inserted neck first into holes formed in an inclined board so that the bottles are inclined downwardly toward the neck opening. When they are pulled slightly out of the openings, rotated a quarter turn and slammed back into place, the rotating action of the bottle produces a spiral action of the particulate solids, as may be observed by inspecting bottles at an intermediate point in the hand riddling operation.

It is believed that the efficiency of the hand riddling operation is enhanced by this spiraling action, perhaps because the twisting of the bottle creates a momentary relative motion between the bottle and its contents which exerts a wiping action to help move the particulate matter along the inner surfaces of the bottle.

It has been observed that tilting the bottle first in one direction, then in an angularly offset direction, then in a further angularly offset direction, etc., speeds up the riddling action and improves clarification. Accordingly, it is a principle object of the present invention to provide a method and apparatus for mechanical riddling of bottled wine which selectively effects an abrupt limited lateral movement of the bottle in a plurality of directions so as to create a novel action of particulate materials in the wine facilitating their downward progress to the neck of the bottle.

Another object of the present invention is to provide a method and apparatus of the character described having provision for automatically cycling the abrupt and limited lateral movement of the bottle in different lateral directions in a desired sequence.

A further object of the invention is to provide a method and apparatus in which the abrupt limited lateral movement of the bottle is accomplished by rapid tilting of same.

A still further object of the present invention is to provide a method and apparatus of the character set forth in which a plurality of bottles of wine to be riddled are mounted in individual compartments of packing cases which, in turn, are stacked upon a pallet so that the desired rapid tilting of all of the bottles of wine to be riddled is accomplished by rapid tilting of the pallet.

Yet another object of the present invention is the provision of a method and apparatus of the character described in which the bottles are also vibrated to assist the jostling action caused by the abrupt limited lateral movement in effecting riddling of the wine.

Another object of the present invention is to provide an apparatus of the character described capable of automatically cycling the tilting action and the vibrating action through active and passive periods of predetermined and adjustable duration.

Further objects and features of advantage will become apparent from the following specification and the claims.

METHOD

The method of the present invention is directed basically to the steps of inverting a bottle of wine to be riddled to a substantially neck down position, and then effecting abrupt limited lateral movement of the bottle in a plurality of directions in a desired sequence and with quiescent periods between such movements. The abrupt lateral movement dislodges particulate solids in the wine from adherence to the inner surface of the bottle, and the quiescent periods permit the dislodged particulate material to sink through the wine toward the extreme end of the neck of the bottle. The quiescent periods are timed for maximum efficiency with the particular wine being riddled, different varieties of wines and different batches within a variety often having different sink rate characteristics.

In accordance with the preferred form of the invention, the abrupt limited lateral movement of the bottle in different directions is accomplished by rapidly tilting the bottle in the desired directions. The tilting is abruptly halted with the upper side of the bottle, including the tapering neck portion, generally at or past vertical by a distance sufficient for solids in the wine dislodged by the abrupt limited lateral movement to tend to sink away from the interior surface of the side of the bottle which is uppermost at that time.

The method of the present invention also contemplates that the bottle be vibrated during at least a portion of the quiescent periods so as to reduce re-adherence of solids in the wine to the inner surfaces of the bottle as the solids sink toward lower extremity of the bottle neck. The bottle is vibrated for periods of predetermined and adjustable time, duration, and intensity, again having regard to the riddling characteristics of the wine being treated.

The method of the present invention also contemplates confining the bottle of wine within a compartment, having lateral dimensions slightly exceeding the diameter of the bottle, and imparting abrupt limited lateral movement to the compartment so as to cause the bottle to be displaced rapidly from one side of the compartment and to bump against the opposite side. The method further contemplates simultaneous riddling of a plurality of bottles of wine, each carried in one of a plurality of compartments provided by a pasteboard case, with the abrupt limited lateral movement of the bottles being caused by tilting the entire case. Carrying this concept a step further, the method of the present invention also contemplates stacking a plurality of the cases on the pallet for joint movement therewith, and imparting the abrupt limited movement to the pallet and its entire load, preferably by rapid tilting of the pallet in the various desired directions.

In accordance with the preferred form of the invention, the bottles of wine are packed in compartmented shipping cases, where they remain during the entire fermentation, aging, settling, and riddling procedures. Clarified wine is placed in bottles, together with yeast, sugar and bentonite, the bottles then being temporarily sealed with crown caps and placed in individual compartments in conventional shipping cartons and cases. The cases of bottles are then stacked on pallets with the bottles upright. The loaded pallets are maintained in this position (bottles upright) at a control temperature of about 65° to 70° F. for a period of about two to six months during which fermentation takes place.

At the end of the fermentation period, a second pallet is placed on top of the pallet load of cases, and the entire load is lifted and turned upside down, preferably by an inverting forklift, so that the bottles are standing on their crown caps. The inverted cases, now supported by the second pallet, are allowed to stand from about six months to eighteen months. During this period, the wine ages and the major portion of solids in the wine settles down into the necks of the bottles. The bentonite is a colloidal mineral clay, the particles of which when disbursed through the wine have an affinity for yeast cells and other solids. Because of higher average specific gravity, the bentonite particles and the solids adhering thereto tend to sink more rapidly through the wine into the necks of the inverted bottles than would the solids alone. In this manner, approximately 95% to 98% of particles and suspended solids settle out into the neck during the aging and settling period.

The unit, consisting of the stack of cases of inverted bottles stacked upon a pallet, is secured to the pallet for joint movement, and the described abrupt limited lateral movement is imparted to the pallet. As described in connection with the preferred form of the invention set forth in this application, the abrupt limited lateral movement preferably is imparted by rapid tilting of the pallet and its load of cases of bottles of wine to be riddled. However, it should be apparent that any abrupt limited lateral movement of the magnitude and character described will tend to dislodge the solids and cause them to sink towards the outlets of the inverted bottles.

The preferred form of the invention contemplates imparting a rapid tilting movement to the entire unit of stacked cases for effecting the desired abrupt limited lateral movement of the bottles. It should be noted that the diameter of the bottle is slightly less than the corresponding dimension of the individual shipping case compartment in which the bottle is contained, and the bottles are somewhat shorter than the height of the individual compartments. Thus, when the case is tilted quickly to one side, the bottle pivots on the crown cap resting against the bottom end of the compartment and impacts against the wall of the compartment in the direction of incline. When the case is quickly tilted in another direction, the bottle flops over against the now lower wall of the compartment. Although the clearance is comparatively small, about one-eighth inch, it is believed that the flip-flop action of the bottles in the compartments materially enhances the jostling effect.

The purpose of the jostling is to dislodge particles from any adherence to the inner surface of the bottle, particularly the inwardly curving walls of the neck of the bottle, so as to promote settling of such particles onto the crown cap or other device fitted across the mouth of the bottle. The described vibrating of the pallet and cases of bottles also serves to dislodge particles from the inner surface of the bottle and prevent them from re-adhering thereto as the particles sink through the wine toward the mouth of the bottle.

In carrying out the method of the invention, it has been found that solids in some wines tend to adhere more firmly to the bottle. The method of the present first invention therefore contemplates controlling the jostling and vibrating actions in accordance with the characteristics of the particular wine being riddled. It has been found that the jostling and vibrating actions should be intermittent, with periods of activity being separated by rest periods during which the solids can settle further down into the necks of the bottles. The duration of the periods of activity and the rest periods is controlled in accordance with the characteristics of the solids in the particular wines being riddled.

It has also been found that optimum riddling of most champagnes by the method of the present invention can be accomplished by providing active periods of from about ten minutes to about thirty minutes separated by rest periods of about one hour to about six hours. A large number of cases of champagne have been riddled utilizing the method of the present invention in active periods of from fifteen minutes separated by inactive periods of about one hour and forty-five minutes, so that the entire cycle takes place during a two hour period of time.

When the bottled wine has been sufficiently clarified by the riddling process of the present invention, the necks of the inverted bottles are refrigerated to freeze a slug of ice in the neck containing the settled solids, the crown caps are removed so that the internal pressure of the gases in the bottles can eject the slugs of ice, and the bottles are corked. Under certain conditions, it is preferred to place a small plastic cup in the mouth of the bottle before the crown cap is applied. When the bottle is inverted, this cup opens upwardly to receive the solids. This cup or "bidule" may then be discharged with the contained solids from the bottle when the crown cap is removed.

APPARATUS

The apparatus of the present invention is designed to carry out the described method upon numbers of cases of bottles simultaneously and automatically. A preferred form of this apparatus is illustrated in the accompanying drawings, in which:

FIG. 1 is a schematic perspective view of an apparatus for riddling bottled wine constructed in accordance with the present invention and illustrating steps in the fermentation, aging and riddling process.

FIG. 2 is a fragmentary view on an enlarged scale of portions of the cases of bottles illustrating the tilting from side to side accomplished by the apparatus for accomplishing a desired jostling of the bottles.

FIG. 3 is an enlarged fragmentary cross sectional view of the neck portion of one of the bottles of FIG. 2 showing settling of solids from the bottled wine into a fitment at the mouth of the bottle.

FIG. 7 is a top plan view of the appartus of FIG. 5, with the pallet load of cases removed and with portions broken away for clarity of illustration; FIG. 7 further incorporating a schematic view illustrating connections to operating controls.

FIG. 11 is a time chart showing duration of cycles.

Figure 4A:
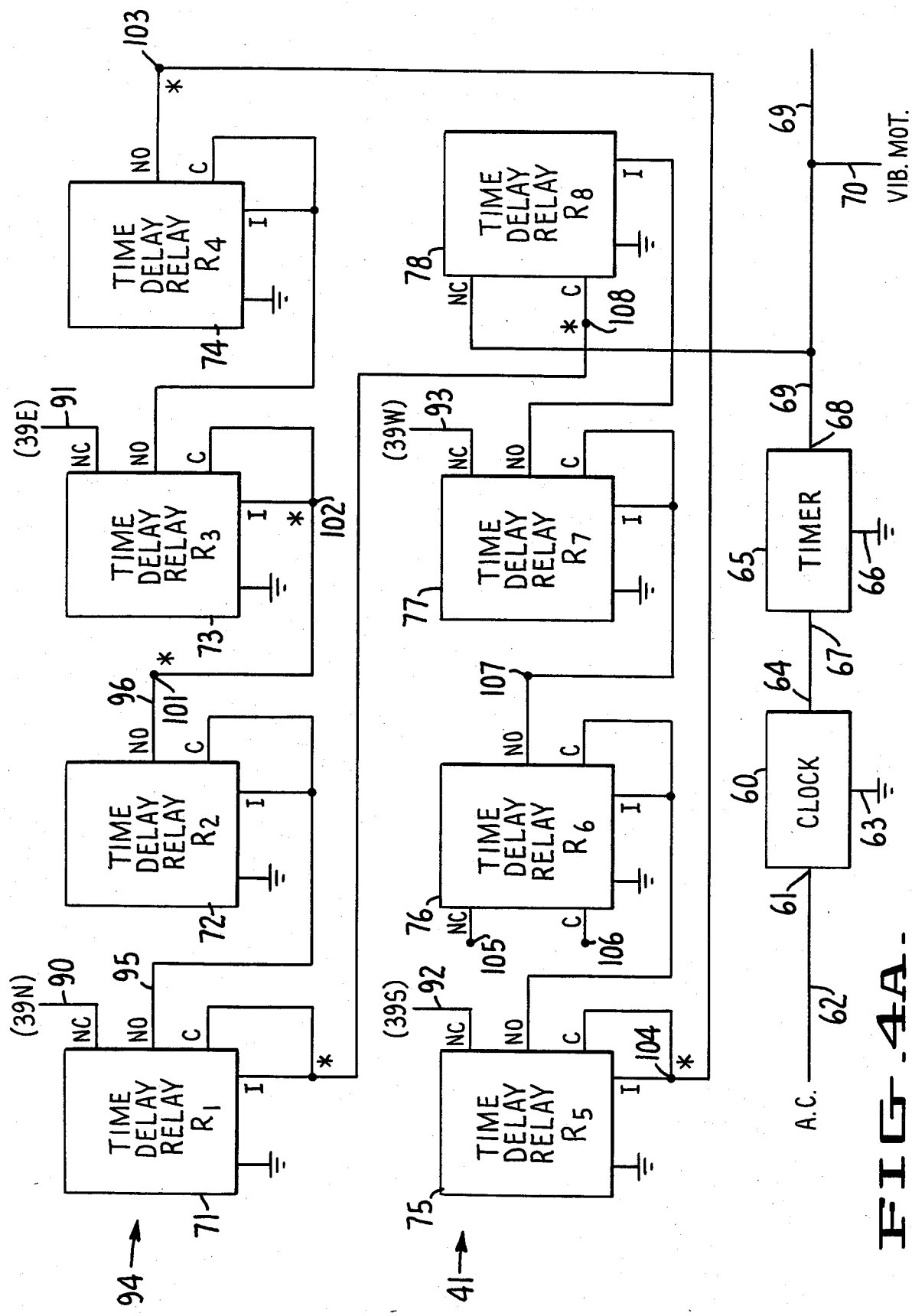
FIGS. 4A through 4C illustrate the electrical controls for the automatic operation of the apparatus of a preferred embodiment of the present invention.

While only a single preferred form of the invention is illustrated in the drawings, it will be apparent from the specification and claims that certain modifications may be made to the apparatus without departing from the spirit of the invention.

Referring to the drawings in detail, it will be seen that the apparatus of the present invention includes holding means 11 formed for carrying bottled wine in cases 12 with the bottles 13 in generally neck down inverted position, jostling means 14 having an operative connection to the holding means 11 and formed for selectively effecting an abrupt limited lateral movement of the bottles 12 in a plurality of directions, and control means 16 for the jostling means 14 formed for controlling the direction of the described abrupt limited lateral movement of the bottles so as to accomplish riddling of the wine therein to thereby facilitate sinking of solid particles through the wine to the discharge end of each bottle.

In accordance with the present invention, it is preferred to support a plurality of bottles of wine for effecting the aforesaid limited lateral movement ("jostling") of the bottles substantially simultaneously in substantially the same direction. The bottles of wine are confined within an enclosure 17 and the jostling means 14 is formed to effect the jostling action on the enclosure and the bottles of wine contained therein.

The enclosure 17 is formed to provide separate compartments 18 for the individual bottles of wine, with each of the compartments 18 having lateral dimensions slightly exceeding the diameter of the bottle to be contained therein, whereby the abrupt limited lateral movement of the enclosure causes the bottles to be displaced rapidly from one side of their compartments to the opposite side. It has been found that the pasteboard cases used for shipping the finished wine performed admirably under the circumstances set forth so that the bottles of wine to be riddled are loaded into the shipping cases, allowed to ferment in upright position therein, inverted, and thereafter riddled (see FIG. 1), thus saving the large amounts of labor heretofore expended in removing bottles from temporary aging cases, and inserting them into riddling racks, removing the bottles from the racks and replacing them in the temporary cartons, etc.

It may thus be seen that in the form of the invention illustrated in the drawings, the holding means 11 comprises one or more compartmented shipping cases 12. An enclosure of much larger capacity than an individual shipping case is here provided by stacking a plurality of shipping cases 12 on a pallet 19, in the manner best seen in FIG. 1 of the drawings.

In accordance with the present invention, and as a major feature thereof, the jostling means 14 is formed for effecting the described abrupt limited lateral movement (jostling) of the holding means 11, and the bottle or bottles 13 supported thereby, selectively in a plurality of lateral directions. Previous riddling devices have jostled the bottles by rapidly tilting them back and forth in a single vertical plane. We have found that riddling may be accomplished faster and better by jostling the bottles sequentially in a plurality of horizontal directions, rather than simply back and forth. For this purpose, the jostling means 14 here comprises a support element or bed 21 formed for mounting the holding means 11 for joint movement therewith, and drive means 22 operatively connected to the support element 21 and formed for effecting the desired abrupt limited lateral movement of the support element 21 (and the load carried thereon) in selected ones of a plurality of directions.

In the form of the invention illustrated in the drawings, the abrupt limited lateral movement of the holding means 11 and the bottle or bottles 13 supported thereby is accomplished by effecting rapid tilting of the holding means in the desired plurality of directions, although it should be apparent that horizontal displacement without tilting of the holding means 11 is also feasible.

As shown in the accompanying drawings, the support element or bed 21 is carried on a plurality of pivot means 23 defining the corners of a polygon (the poylgon herebeing a square). With this polygonal arrangement, tilting of the support element about different ones of the pivot means 23 accomplishes the desired tilting in corresponding directions.

Figure 5:
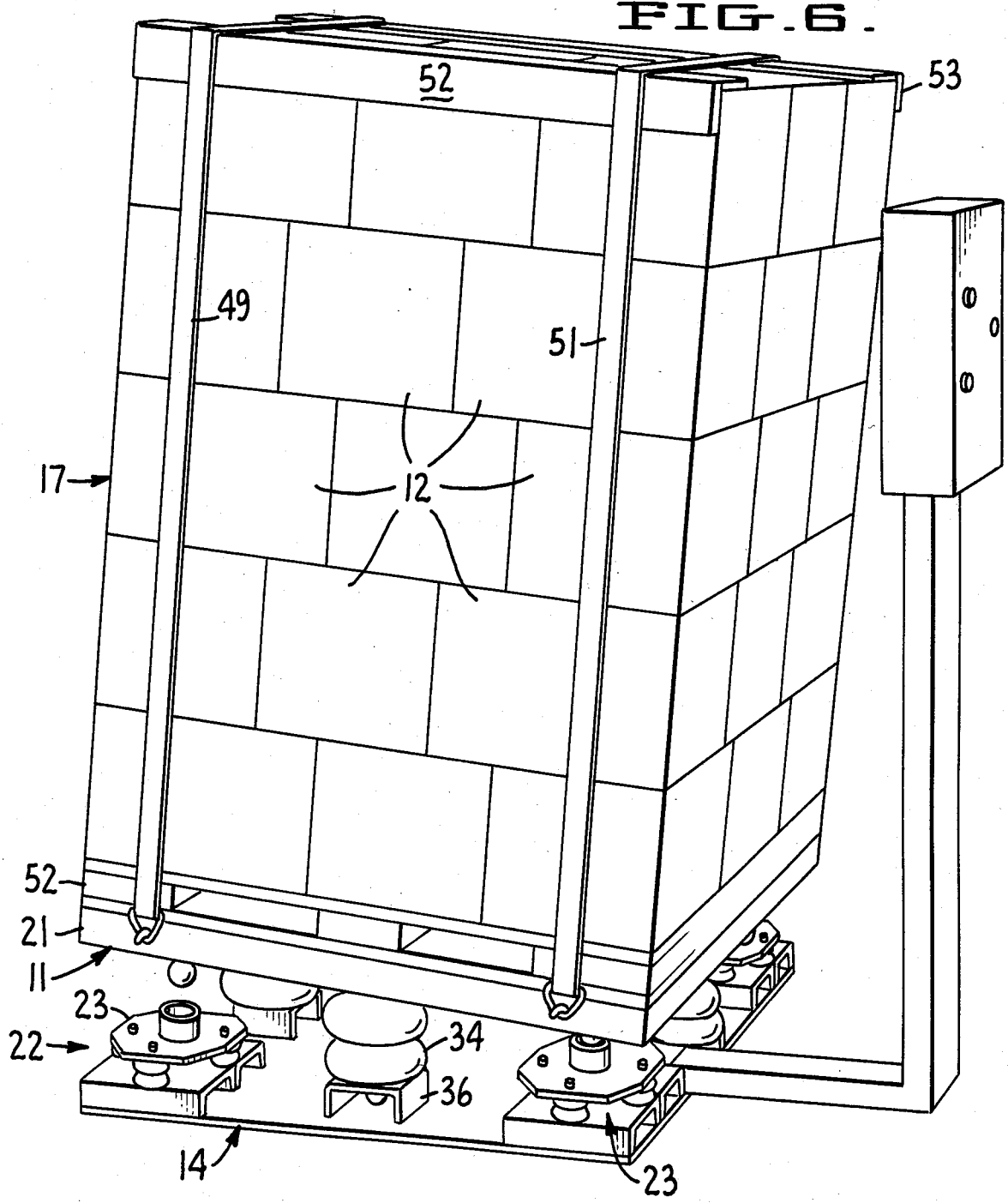
FIG. 5 is a perspective view of an apparatus constructed in accordance with the present invention, shown in operation tilting a pallet load of stacked cases of bottled wine in a variety of directions.
Figure 9:
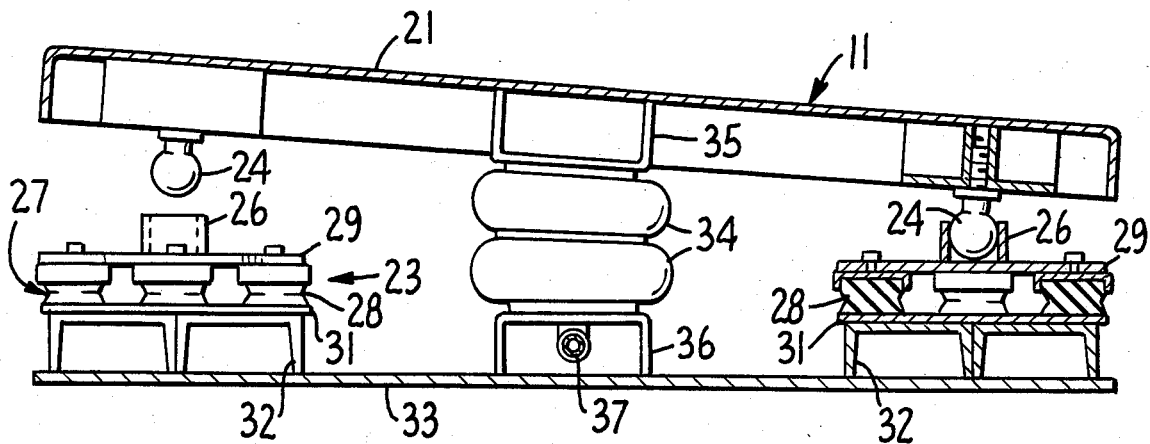
FIG. 9 is a vertical cross-sectional view taken substantially on the plane of line 9—9 of FIG. 7.

In accordance with the present invention, and as may be best seen in FIGS. 5 and 9 of the drawings, the pivot means 23 each comprises a pivot member 24 engageable in a complementary socket 26, with the pivot members 24 being free to be lifted from their sockets 26 when the bed 21 is being supported for tilting away from that socket. While the bed 21 could pivot about a single pivot means 23, the unit would tend to be unstable, particularly where the apparatus for lifting bed 21 to cause it to tilt about the selected pivot means 23 is yielding and does not provide a solid mechanical link-up.

According to the invention, the bed 21 and the load it supports are vibrated at times to enhance the sinking action of the solid particulate matter through the wine to the bottle outlet without re-adhering to the internal wall surfaces of the bottle. For such vibration to be effective, the bed 21 supporting the holding means 11 must "float", meaning that the bed 21 must be supported in such manner that it may be vibrated without the dampening effect which would be created by direct solid mechanical link-ups with the structure supporting the riddling unit. Accordingly, the pivot means 23 are each here provided with resilient support means 27 providing limited freedom of movement.

The pivot means 23 are each formed with a ball shaped pivot member 24 supportable in a complementary socket 26 capable of restraining the ball 24 from lateral movement, but permitting both rotation of the ball within the socket and lifting of the ball from the socket. Each of the sockets 26 is mounted on a resilient support means 27 which, as here shown, consists of four specially formed pads of resilient material 28 sandwiched between a bearing plate 29, carrying a socket 26, and a plate 31 supported by channel sections 32 on a foundation plate 33.

The drive means 22, for selectively tilting the support element 21 and the load thereon in a plurality of different directions, here comprises a plurality of drive members 34 operatively connected to the support element or bed 21 and adapted for engaging a fixed member 36 secured to foundation plate 33, with each of the drive members 34 being mounted in laterally spaced relation to each other and to the pivot means 23.

Figure 8:
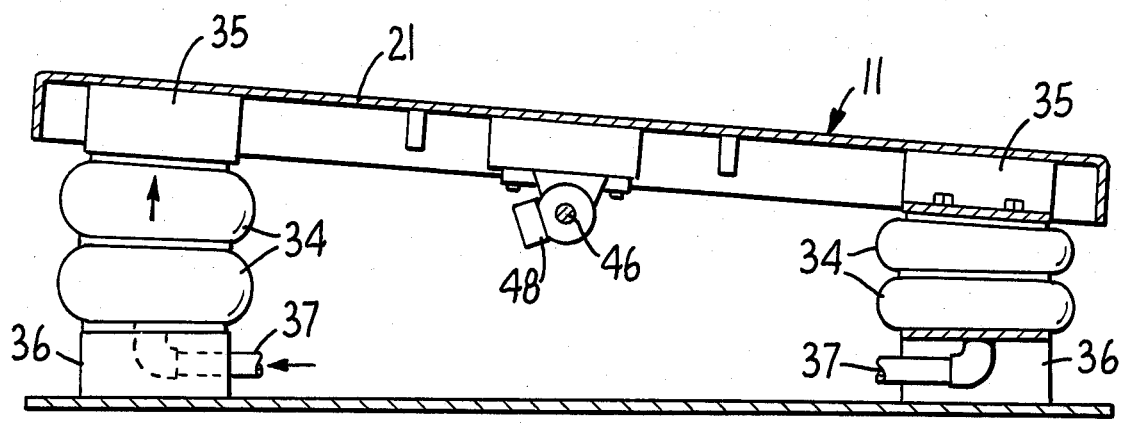
FIG. 8 is a vertical cross-sectional view taken substantially on the plane of line 8—8 of FIG. 7.

The drive members 34 are preferably in the form of axially expanding lifting members, such as the axially expandable airbags best seen in FIGS. 5, 8 and 9 of the drawings. As there shown, the airbags 34 are supported on channel sections 36 resting upon foundation plate 33, with each of the airbags 34 being supplied with air under pressure through supply conduits 37. The upper ends of airbags 34 support channel sections 35 attached to the underside of bed 21. Air under pressure is supplied through manifold 38 from a suitable conventional source (not shown). Each of the conduits 37 is provided with a remote control valve 39 operatively connected to a programmer 41; the valves 39, programmer 41 and an associated motor control 42 together constituting the control means 16.

As a feature of the present invention, the control means 16 is formed for effecting the previously described abrupt limited lateral jostling movement of the holding means and the bottles supported thereby in different lateral directions in a desired sequence. For this purpose, the control means is programmable and is capable of unattended automatic operation in a programmed sequence.

The programmer 41 is formed for automatically cycling the drive means through active and passive periods of predetermined and adjustable duration, and is described hereinbelow with reference to FIGS. 4A through 4C of the drawings.

Figure 10:
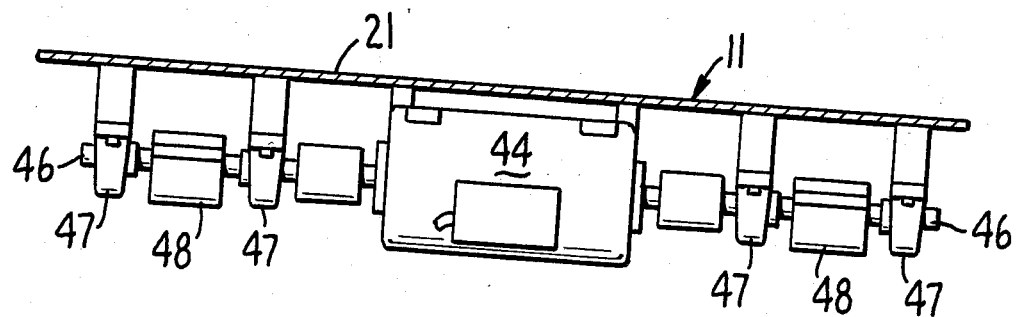
FIG. 10 is a vertical cross-sectional view taken substantially on the plane of line 10—10 of FIG. 7.

As a further feature of the invention, the present apparatus is capable of imparting vibratory motion to the bottles and the wine being riddled so as to discourage particles dislodged from the inner walls of the bottle from re-adhering to such inner walls while they are sinking through the wine. This vibratory movement is provided by vibration means 43 preferably mounted on the underside of bed 21 in the manner best seen in FIGS. 7, 8 and 10 of the drawings; the vibration means 43 here comprising an electric motor 44 mounted on the underside of bed 21 and formed for driving a shaft 46 journaled in bearings 47 also secured to the underside of bed 21. Weights 48 are eccentrically secured to shaft 46 for joint rotation therewith. The speed of rotation of the weights 48, and hence the periodicity of the vibration is governed by motor control 42 which regulates the speed of the drive motor 44.

The amplitude and frequency of the vibrations are adjustable both by varying the speed of the motor 44 and the physical characteristics of the eccentric weights 48 by substituting replacement eccentric weights of different mass and/or effective lever arm. This control over the intensity and rate of vibration facilitates riddling of different batches of wines having differing physical characteristics. For example, we have found that a pallet load of champagne (weight about 2500 lb.) plus bed 21 and associated motor and eccentric weight assembly (weight about 155 lb.) are effectively riddled using a shaft speed of 1725 R.P.M.

The pallet loads of cases of bottles are preferably tied down to the bed 21 during the riddling operation. A suitable tie down device is illustrated in FIG. 1 of the drawings, wherein a pair of flexible bands 49 and 51 are passed over the top of the load of boxes on the pallet 52 resting on bed 21, and the bands 49 and 51 are pulled tight by conventional ratchet winch devices (not shown). The cartons 12 are protected against crushing of their edges by removable angle members 52 and 53.

As may be seen in FIG. 3 of the drawings, the riddling action of the apparatus causes the solid particles 54 to settle out of the wine 55 onto the temporary crown cap 56. Ordinarily, the solids 54 come to rest directly upon the crown cap until they are frozen into the plug of ice which is ejected when the crown cap is removed. It has been found that a small plastic cup 57, sometimes called a "bidule", may be inserted into the mouth of the bottle before the crown cap 56 is applied. The solids 54 will then settle into the bidule 57 and may be discharged from the bottle with the bidule when the crown cap is removed.

Referring again to FIGS. 4A through 4C, and comparing the same with FIG. 7, the structure and operation of control means 16 will now be described.

Referring first to FIG. 4A, there is shown therein in schematic block diagram form the circuit of programmer 41.

Programmer 41 comprises a plurality of commercially purchasable subcircuit devices, each of which is represented by a rectangular block in FIG. 4A.

Time clock 60 of FIG. 4A is a time clock of well-known type, such as an Intermatic time clock No. T1975. In mode A of the operation of the preferred embodiment as principally shown and described herein, the riddling of a plurality of cases 12 of champagne, secured to holding means 11 is carried out under the control of time clock 60 over a period of about one week (a "programmer cycle"), during which period time clock 60 causes its associated timer 65 to execute a full cycle of its operation (called a "timer cycle") once each hour.

A complete cycle of operation of the riddler of the invention, extending from the time when the cases 12 are mounted on holding means 11 to the time when the cases 12 are removed from the holding means 11, will sometimes be called the "riddling cycle".

In the well-known manner, time clock 60 is provided with a power input terminal 61, which is connected to a 115 volt alternating current power line 62, a ground terminal 63, which is connected to the ground connection of power line 62, and an output terminal connected to a supply conductor 64 by means of which alternating current voltage is provided to a timer 65 at times and over time intervals determined by time clock 60.

Timer 65 is a motor driven timer of well-known type, such as the RTM-SP2N timer made and sold by the IDEC Systems and Control Corporation of 3050 Tasman Dr. Santa Clara, Ca. 95050, which has a two minute to sixty minute timing range. In the preferred embodiment timer 65 is set to its eight minute timing setting, and is connected with its motor and clutch in parallel branches across its operating power input terminals 2 and 7, the cam-operated motor control switch being connected in series with the motor. In this connection timer 65 is started whenever line voltage is newly applied between input terminals 2 and 7 (herein 66 and 67, respectively) by the clock 60.

When line voltage is thus newly applied to timer 65, timing operation immediately starts, but the moveable contacts of timer 65 remain in their quiescent or unoperated position, and thus the line voltage supplied by time clock 60 appears on output terminal 68 and conductor 69. This line voltage remains on conductor 69 until the expiration of the above-described eight minute timer setting, at which time the moveable contacts of timer 65 are moved to their operated position, and thus the line voltage is disconnected from conductor 69. The moveable contacts remain in this operated position until timer 65 is reset by the disappearance of line voltage on the output line 64 of clock 60, whereupon the moveable contacts return to their unoperated position, whereby line voltage can be applied to conductor 69 when time clock 60 again operates to provide line voltage to line 64. (Clock 60 must supply line voltage to timer 65 for more than eight minutes.)

Thus it will be seen that in the particular mode of operation A of the preferred embodiment of our invention particularly shown and described herein time clock 60 and timer 65 operate conjointly to apply line voltage to conductor 69 for eight minutes of each hour of the programmer cycle.

As also seen in FIG. 4A, the power supply line 70 of motor controller 42 (FIG. 7) is directly connected to conductor 69, and thus motor controller 42 causes vibrating motor 44 to operate continuously during the eight minute timer cycle, which occurs once during each hour of the programmer cycle.

It follows, then, that holding means 11, the shipping cases secured thereto, and the champagne bottles in those cases are continuously jostled throughout each eight minute timer cycle. Holding means 11, etc., are not jostled during the intervals between timer cycles.

Referring again to FIG. 4A, it will be seen that programmer 41 also comprises eight time delay relays 71 through 78, sometimes referred to herein by the corresponding reference designations R1 through R8, i.e., relay 1 through relay 8.

Each of the delay relays 71 through 78 is a time delay relay of the well-known type made and sold by Syracuse Electronics, P.O. Box 4770, Syracuse, N.Y. 13221, under the commercial designation No. TNR00311. This time delay relay is a delay-on-make relay, a schematic diagram of which is shown at the right hand side of FIG. 4B. Due to its delay-on-make mode of operation, the moveable contacts of this relay remain in their unoperated state when power is applied to its input terminals (pins 2 and 7) until the passage of the preset delay interval, whereupon the movable contacts move to their operated position.

The moveable contacts then remain in their operated position until the input power is removed from the input terminals. Resetting can also be accomplished during the delay interval by removal of the input power. The delay interval may be reset over the range of 0.6 to 60 seconds. In the preferred embodiment particularly shown and described herein the delay interval of time delay relays 71, 73, 75, and 77 is set to 60 seconds, and the delay interval of time delay relays 72, 74, 76, and 78 is set to 5 seconds.

Figure 4B:
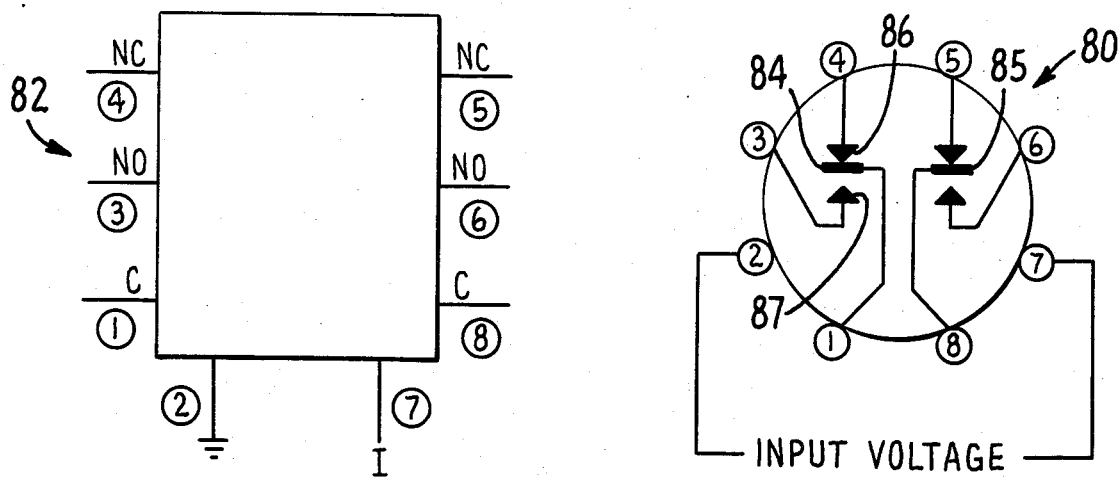

Referring now to FIG. 4B, there is shown a schematic representation 80 of a time delay relay of the type used in the preferred embodiment, derived from the manufacturer's catalogue, and a second schematic representation 82 of the same time delay relay, which schematic representation is adopted herein for clarity of exposition.

The movable contacts 84, 85 shown in representation 80 are shown in their normal or unoperated state. Thus the fixed contact 86 is referred to as a normally closed or NC contact, the fixed contact 87 is referred to as a normally open or NO contact, etc. The pins 1 and 8 which are connected to the movable contacts 84 and 85 are referred to herein as common or C pins or terminals. The correspondence between the pins of representation 80 and the corresponding terminal lines of representation 82 are indicated by placing the pin numbers of representation 80 next to the corresponding terminal lines of representation 82. Pin 2 is shown in representation 82 as connected to ground because the corresponding pins of all of the relays 71 through 78 (FIG. 4A) are connected to ground. Pin 7 is labeled with a capital letter I in representation 82 to indicate that the operation initiating input signal is supplied thereto. In FIG. 4A only the terminal leads of the relays 71 through 78 which are actually used are indicated in the corresponding representations. Thus, the three left hand terminal lines are not shown on the representation of relay 71 because they are not used.

Referring again to FIG. 4A, it will be seen that four relays 71, 73, 75, 77 have NC terminals, 90, 91, 92, and 93 connected respectively to the solenoid-operated air control valves 39N, 39E, 39S, and 39W. (The designations N, E, S, and W, do not imply geographic orientation of the corresponding solenoid valves or airbags.) Thus, it will be seen that each relay 71, 73, 75, 77 supplies operating current to a corresponding solenoid-operated valve for the purpose of tilting holding means 11 in a corresponding direction. For this reason, relays 71, 73, 75, and 77 may be called tilting or deflection relays.

The other four relays 72, 74, 76, 78 serve to provide a suitable delay time of about 5 seconds between solenoid-operated valve actuations, during which delay times holding means 11 returns to its neutral or undeflected position. The particular valves 39 by means of which the unpressurized airbags are bled to atmospheric pressure to permit these deflections can be provided by those having ordinary skill in the art without the exercise of invention or undue experimentation.

As will now be understood by those having ordinary skill in the art, informed by the present disclosure, relays 71 through 78 (which are together called the "relay bank 94") are so interconnected that whenever line voltage is supplied to line 69 (FIG. 4A) by timer 65, as described above, relay bank 94 operates to cause drive means 22 to cyclically tilt holding means 11 in its four tilt directions, seriatim.

The complete cycle of operation of relay bank 94, which causes drive means 22 to execute its corresponding complete cycle of operation, will be called the "relay bank cycle", and the corresponding cycle of operation of drive means 22 will be called the "tilt cycle". The operating time of each tilting relay 71, 73, 75, 77 will be called a "tilting phase", and the operating time of each delay relay 72, 74, 76, 78 will be called a "delay phase". Thus, during tilt phase 1 (produced by relay 71) holding means 11 will be rapidly driven to its extreme tilt position in the N direction by a corresponding airbag, the N airbag controlled by valve 39N, and will remain so tilted until relay 71 switches, cutting off the current to valve 39N.

When relay 71 switches its NO contact energises line 95 and invokes the 5 second delay provided by relay 72, giving time for holding means 11 to be returned to its neutral position.

When relay 72 "times out", i.e., ends its delay cycle, the voltage appearing on its NO terminal 96 is applied to relay 73, causing the tilting of holding means 11 in the E direction. The further operation of the relay bank cycle will be apparent to those having ordinary skill in the art, informed by the present disclosure. It is to be noted, however, that the resetting of relay 78, caused by relay 77, which is in turn caused by the loss of line voltage on terminal I of relay 71 due to the switching of relay 78, brings about the repetition of the relay bank cycle. Thus, two relay bank cycles, and corresponding tilting cycles, will take place during the eight minute cycle of operation of timer 65.

Figure 4C:
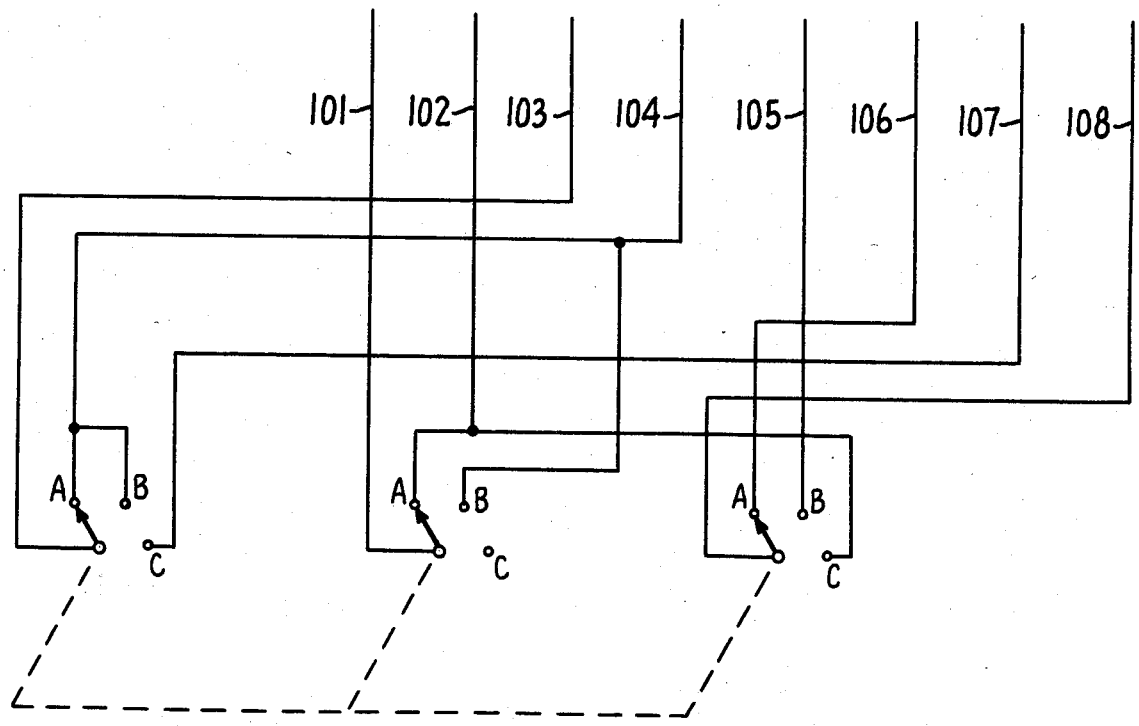
Figure 6:
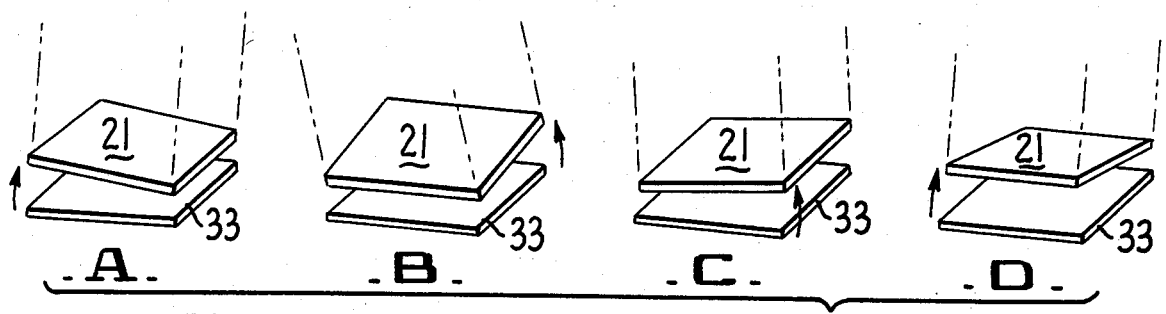
FIGS. 6A through 6D are schematic depictions of possible directions of tilting for the apparatus of FIG. 5.

Referring now to FIG. 4C, there is shown a manual switching network 100 which provides not only the just described mode A of riddler operation but also two other modes of operation, C and D, in each of which tilting takes place in only one direction, N-S, or E-W.

Switching network 100 can be connected to the circuit of FIG. 4A by (a) eliminating from the circuit of FIG. 4A the connections having asterisks at their opposite ends, and (b) connecting the terminals 101 through 108 of FIG. 4C to the correspondingly labeled points of FIG. 4A.

It is to be particularly noted that while exemplary cycle times, phase intervals, and modes of operation are given hereinabove by way of illustration, our invention is not limited to any particular cycle times, phase intervals, or modes of operation of the riddling apparatus of our invention.

In view of the foregoing, it will be seen that the method and apparatus of the present invention provides extremely efficient automatic mechanical riddling of bottled wine by permitting the fermenting aging and settling, and riddling operations to be carried out in an efficient, economical and nonlabor intensive manner.

What is claimed is:

1. Apparatus for riddling bottled wine, comprising holding means formed for carrying a bottle of wine in generally neck down inverted position, jostling means having an operative connection to said holding means and formed for selectively effecting an abrupt limited lateral back and forth movement of said bottle in a plurality of different directions, and control means for said jostling means formed for controlling the direction of said abrupt limited lateral movement of said bottle so as to accomplish riddling of the wine therein.

2. Apparatus as described in claim 1 and wherein said holding means is formed to support a plurality of bottles of wine.

3. Apparatus as described in claim 2 and wherein said jostling means is formed for effecting said abrupt limited lateral movement of said plurality of bottles substantially simultaneously in substantially the same direction.

4. Apparatus as described in claim 3 and wherein said holding means confines said bottles of wine in an enclosure, and said jostling means is formed for effecting said abrupt limited lateral movement of said enclosure and the bottles of wine contained therein.

5. Apparatus as described in claim 4 and wherein said enclosure provides separate compartments for the individual bottles of wine.

6. Apparatus as described in claim 5 and wherein each of said compartments has lateral dimensions slightly exceeding the diameter of the bottle to be contained therein whereby said abrupt limited lateral movement of said enclosure causes said bottles to be displaced rapidly from one side of their compartments to the opposite side.

7. Apparatus as described in claim 6 and wherein said holding means comprises a compartmented shipping case.

8. Apparatus as described in claim 7 and wherein said holding means further comprises a plurality of compartmented packing cases stacked on a pallet.

9. Apparatus as described in claim 1 and wherein said jostling means comprises
a support element formed for mounting said holding means for joint movement therewith,
and drive means operatively connected to said support element and formed for effecting abrupt limited lateral movement of said support element in selected ones of a plurality of directions.

10. Apparatus as described in claim 9 and wherein said abrupt limited lateral movement of said holding means and the bottle supported thereby is accomplished by effecting rapid tilting of said holding means in the desired plurality of directions.

11. Apparatus as described in claim 10 and wherein said support element is carried on a plurality of pivot means defining the corners of a polygon whereby tilting of said support element about different pivot means accomplishes said tilting in selected ones of a plurality of directions.

12. Apparatus as described in claim 11 and wherein said pivot means each comprises a pivot member engageable in a complementary socket.

13. Apparatus as described in claim 12 and wherein said pivot members are free to be lifted from their sockets when said support element is being supported for tilting on other of said pivot members.

14. Apparatus as described in claim 11 and wherein said support element is formed to tilt on pairs of said pivot means whereby selection of a particular pair of said pivot means determines the direction of tilting.

15. Apparatus as described in claim 11 and wherein said pivot means are provided with resilient support means providing limited freedom of movement.

16. Apparatus as described in claim 15 and wherein said pivot means are each formed with a pivot member supportable in a complementary socket, and each of said sockets is mounted on said resilient support means.

17. Apparatus as described in claim 16 and wherein said resilient support means comprises a pad of resilient material.

18. Apparatus as described in claim 11 and wherein said drive means comprises
a plurality of drive members operatively connected to said support element and adapted for engaging a fixed member,
each of said drive members being mounted in laterally spaced relation to said pivot means.

19. Apparatus as described in claim 18 and wherein said drive members are axially expandable lifting members.

20. Apparatus as described in claim 19 and wherein said axially expandable lifting members are air bags, and means is provided for selectively inflating and deflating said air bags.

21. Apparatus as described in claim 1 and wherein said apparatus further comprises means for vibrating said holding means and bottle of wine supported thereby to facilitate riddling.

22. Apparatus as described in claim 21 and wherein said means for vibrating is driven by an electric motor, and motor control means is further provided for controlling motor speed and starting and stopping times.

23. Apparatus as described in claim 1 and wherein said control means is formed for effecting said abrupt limited lateral movement of said holding means and the bottle supported thereby in different desired lateral directions and in a desired sequence.

24. Apparatus as described in claim 23 and wherein said control means further comprises timing means formed for automatically cycling said jostling means through active and passive periods of predetermined and adjustable duration.

25. Apparatus as described in claim 24 and wherein said control means further comprises clock means formed for automatically cycling said timing means through a plurality of cycles at predetermined times ove predetermined time intervals.

26. Apparatus as described in claim 25 and wherein said clock means is further formed for selective predetermination of said times and time intervals.

27. Apparatus as described in claim 26 and wherein said control means includes a plurality of time delay units corresponding to the number of directions of said abrupt limited lateral movement of which said apparatus is capable, with each time delay unit controlling the initiation of said abrupt limited lateral movement in a particular one of said directions.

28. Apparatus as described in claim 27 and wherein means is provided for interconnecting said time delay units to provide selective cyclical sequencing of the direction of said abrupt limited lateral movements and the time at which they take place.

29. Apparatus as described in claim 23 and wherein said control means is further formed for selectively controlling the time at which each of said abrupt limited lateral movements occurs.

30. Apparatus as described in claim 29 and wherein said control means includes a plurality of time delay units corresponding to the number of directions of said abrupt limited lateral movement of which said apparatus is capable, with each time delay unit controlling the initiation of said abrupt limited lateral movement in a particular one of said directions.

31. Apparatus as described in claim 30 and wherein means is provided for interconnecting said time delay units to provide selective cyclical sequencing of the direction of said abrupt limited lateral movements and the time at which they take place.

32. Apparatus for riddling bottled wine, comprising holding means for supporting a bottle of wine in generally neck down inverted position, tilt means for selectively tilting said bottle about a plurality of angularly related axes, and control means for said tilt means formed for controlling the direction and rapidity of tilting of said bottle so as to accomplish riddling of wine contained therein.

33. Apparatus as described in claim 32 and wherein said holding means supports a plurality of bottles of wine, and said tilt means moves said bottles in unison.

34. Apparatus as described in claim 33 and wherein said holding means confines said bottles of wine in an enclosure, and said tilt means is formed for selectively tilting said enclosure and bottles of wine contained therein.

35. Apparatus as described in claim 34 and wherein said enclosure is formed to provide separate compartments for the individual bottles.

36. Apparatus as described in claim 35 and wherein said holding means comprises a compartmented shipping case.

37. Apparatus as described in claim 36 and wherein said holding means further comprises a plurality of compartmented shipping cases stacked on a pallet.

38. Apparatus as described in claim 32 and wherein said tilt means is formed for tilting said holding means and the bottle supported thereby selectively in a plurality of lateral directions.

39. Apparatus as described in claim 38 and wherein said tilt means further comprises
a support element formed for mounting said holding means for joint movement therewith,
and drive means operatively connected to said support element in selected ones of a plurality of directions.

40. Apparatus as described in claim 39 and wherein said support element is carried on a plurality of pivot means defining the corners of a polygon whereby tilting of said support element about different pivot means accomplishes said tilting in selected ones of a plurality of directions.

41. Apparatus as described in claim 40 and wherein said pivot means are each formed with a pivot member supportable in a complementary socket, and each of said sockets is mounted on said resilient support means.

42. Apparatus as described in claim 39 and wherein said pivot means each comprises a pivot member engageable in a complementary socket.

43. Apparatus as described in claim 42 and wherein said pivot members are free to be lifted from their sockets when said support element is being supported for tilting on other of said pivot members.

44. Apparatus as described in claim 43 and wherein said support element is formed to tilt on pairs of said pivot means whereby selection of a particular pair of said pivot means determines the direction of tilting.

45. Apparatus as described in claim 39 and wherein said pivot means are provided with resilient support means providing limited freedom of movement.

46. Apparatus as described in claim 45 and wherein said resilient support means comprises a pad of resilient material.

47. Apparatus as described in claim 46 and wherein said drive means comprises
a plurality of drive members operatively connected to said support element and adapted for engaging a fixed member,
each of said drive members being mounted in laterally spaced relation to said pivot means.

48. Apparatus as described in claim 47 and wherein said tilting is effected at desired times and in a desired sequence of different lateral directions.

49. Apparatus as described in claim 46 and wherein said drive members are axially expandable lifting members.

50. Apparatus as described in claim 32 and wherein vibratory means is operatively connected to said holding means, and is formed for intermittently imparting vibration to said bottle so as to assist in riddling the wine contained therein.

51. Apparatus as described in claim 50 and wherein said control means further comprises vibration control means and is formed for automatically cycling said tilt means and said means for vibrating through active and passive periods of predetermined and adjustable duration.

52. Apparatus for riddling bottled wine, comprising
frame means formed for supporting a group of stacked compartemented cases having an inverted bottle of unclarified fermented wine in each compartment,
and tilting means on said frame means formed for imparting repeated tilting action in a plurality of different directions to said frame means and to said stacked cases and bottles of wine supported thereon for dislodging solids in the wine from adherence to said bottles whereby such solids settle to the outlets of said bottles.

* * * * *